March 27, 1956   D. E. YOCHEM   2,739,589
HYPODERMIC SYRINGE GAUGE
Filed Oct. 25, 1954   2 Sheets-Sheet 1
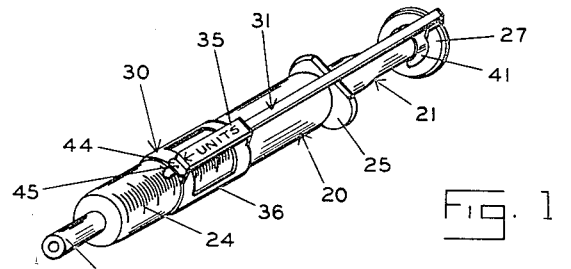
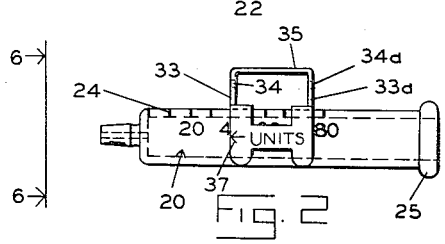
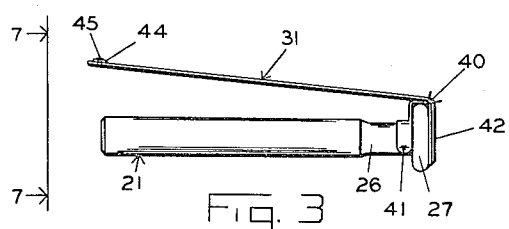
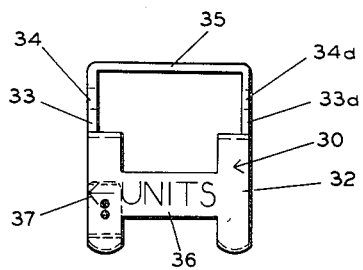
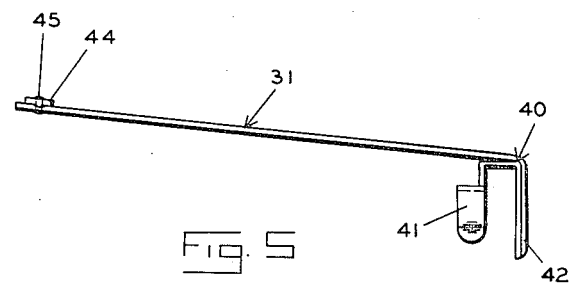
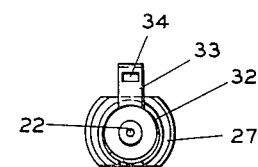
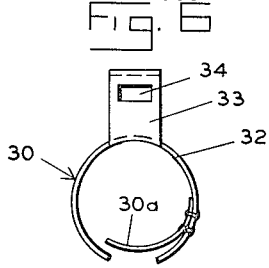
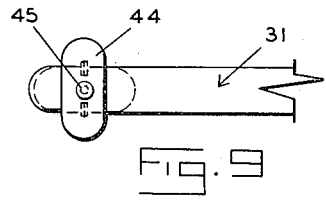
INVENTOR.
DONALD E. YOCHEM
BY
ATTORNEYS March 27, 1956  D. E. YOCHEM  2,739,589
HYPODERMIC SYRINGE GAUGE
Filed Oct. 25, 1954  2 Sheets-Sheet 2
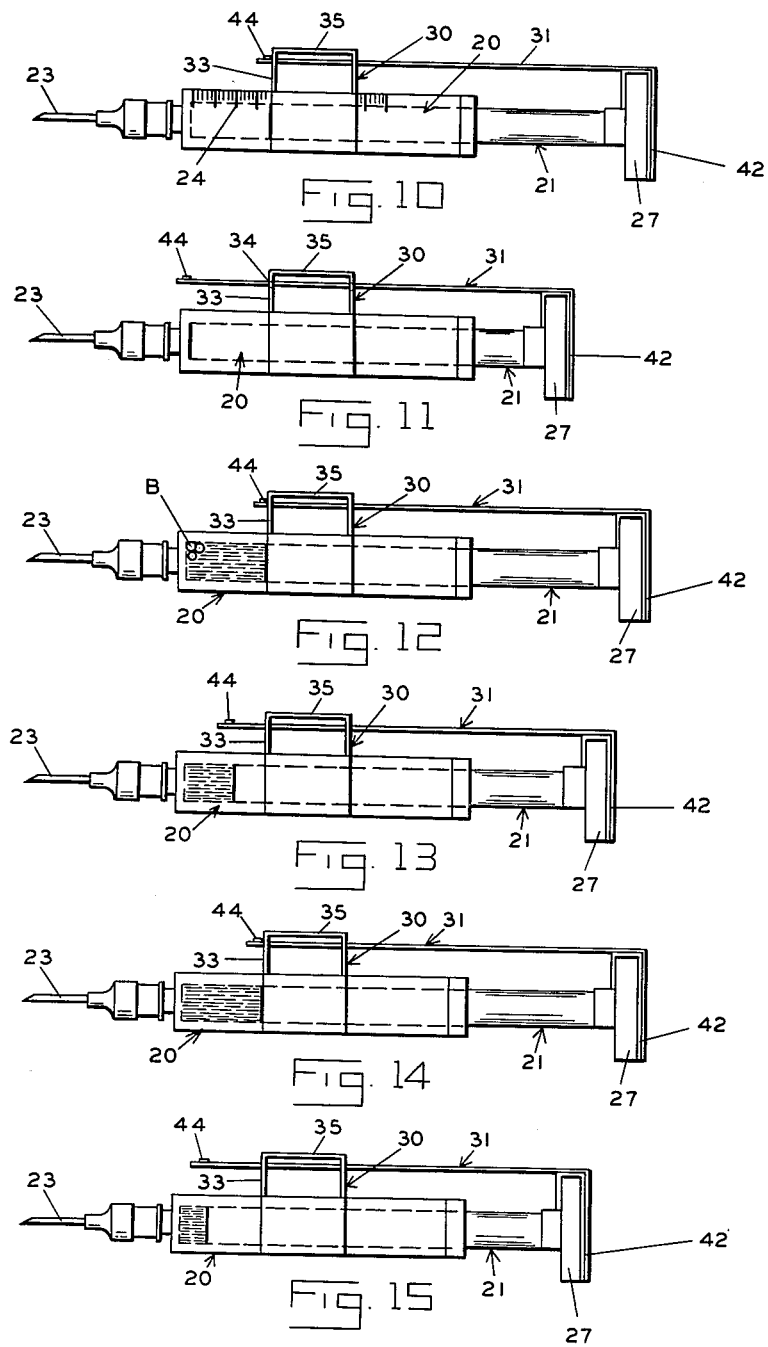
INVENTOR.
DONALD E. YOCHEM
BY
ATTORNEYS

United States Patent Office 2,739,589
Patented Mar. 27, 1956

2,739,589

HYPODERMIC SYRINGE GAUGE

Donald E. Yochem, Columbus, Ohio

Application October 25, 1954, Serial No. 464,207

5 Claims. (Cl. 128—218)

My invention relates to a hypodermic syringe gauge. It has to do, more specifically, with a gauging device which can be readily attached to a hypodermic syringe and can be readily adjusted or set to determine the amount of liquid which can be drawn into the syringe so that it can later be ejected from the syringe.

The greatest usefulness for my instrument is for use by humans who have diabetes mellitus and must administer to themselves daily injections of insulin. It is very difficult or impossible for many of these patients to see the small numbers and lines which indicate the dose of insulin on the usual hypodermic syringe. The exact dose of insulin prescribed by the physician for this type of patient is essential for proper treatment. My instrument can be set by the physician to gauge the correct amount of insulin to be drawn into and then ejected from the syringe, and is thereafter foolproof for the patient to use, thereby preventing the injection of too much or too little insulin. Thus, when my gauge is used, the patient is assured of receiving the exact dose prescribed by the physician, even though the patient has defective vision, or is incompetent to administer the correct dose to himself without my gauge. Furthermore, diabetic patients, even with normal vision, can administer insulin to themselves with greater ease, assurance, confidence, and without wasting insulin, when my gauge is used. Also, my gauge facilitates handling of the syringe in other ways.

In the accompanying drawings I have illustrated an example of my invention. In these drawings:

Figure 1 is an isometric view of a hypodermic syringe having my gauge applied thereto.

Figure 2 is a side view of the barrel of the syringe with the guide clasp of the gauge clasped thereto.

Figure 3 is a side view of the plunger of the syringe with the gauge bar of the gauge applied thereto.

Figure 4 is an enlarged side view of the guide clasp.

Figure 5 is an enlarged side view of the gauge bar.

Figure 6 is an end view taken along line 6—6 of Figure 2.

Figure 7 is an end view taken along line 7—7 of Figure 3.

Figure 8 is an enlarged end view of the guide clasp.

Figure 9 is an enlarged detail in plan of the forward end of the gauge bar showing the pivoted stop thereon.

Figure 10 is a diagrammatic view showing the initial setting of the gauge member on the syringe prior to withdrawing insulin from the vial.

Figure 11 is a similar view showing the syringe after the plunger has been pushed into position to force air into the vial.

Figure 12 is a similar view showing the plunger retracted to filling position, thereby having withdrawn insulin from the vial and into the syringe barrel and having the usual air bubbles in the barrel.

Figure 13 shows the plunger pushed forwardly sufficiently to eliminate the air bubbles produced in filling the syringe.

Figure 14 shows the plunger withdrawn after the bubbles have been eliminated to pull a full dose of insulin into the syringe.

Figure 15 shows the plunger as it is being pushed forwardly during ejection.

With reference to the drawings, in Figure 1 I have illustrated my gauge applied to a hypodermic syringe of a common type. This type of syringe is usually made of glass and comprises the barrel 20 and the plunger 21 mounted for reciprocation therein.

The barrel 20 is provided on its forward end with the needle stem 22 which removably receives the usual hypodermic needle 23 (Figures 10 to 15). The barrel is calibrated in the usual way, being provided with the calibrations 24 which indicate dosage or units. The rear end of the barrel is provided with the usual laterally extending flange 25.

The plunger 21 comprises a body which slidably fits into the barrel 20 and which is provided with a narrowed neck 26 at its rear end which projects from the barrel in the usual way even when the plunger is moved into its forwardmost position. On the extreme rear end of the plunger there is provided the knob or head 27. The head 27 and the narrowed neck 26 serve in the usual way to provide gripping means for retracting the plunger 21 from the barrel and the head 27 serves as pushing means for pushing the plunger into the barrel.

My gauge, which is applied to the syringe, consists of two main parts, the guide clasp 30 which is applied to the barrel 20 and the gauge bar 31 which is applied to the plunger 21 and which cooperate with each other as shown in Figure 1.

The guide clasp 30 comprises a clasping body which includes arms 32 of arcuate form which are greater than a semicircle and are of proper size to fit tightly around the barrel 20. In order to cause the clasp to more tightly engage the barrel, the forward arm 32 is provided with an arcuate spring 30a which is riveted thereto adjacent one end and continues around into overlapping relationship with the other end as shown in Figure 8. The spring 30a serves to provide increased tension to cause the forward arm 32 to more tightly clasp around the barrel 20 and to hold the member 30 in adjusted position thereon but permit axial adjustment of the member 30 along the barrel if sufficient pressure along with a twisting force is applied axially of the barrel on the clasp. When the guide clasp 30 is mounted on the barrel 20, as shown in Figures 1 and 2, it is set by the physician with its forward edge in exact alignment with one of the calibrations 24 on the barrel which is selected by the physician to give the proper number of units of insulin to the patient. The guide clasp 30 also includes the radially extending arms 33 and 33a which are provided with the respective guide openings 34 and 34a which align on an axis parallel to the axis of the clasp 30 and, therefore, parallel to the axis of the barrel 20 when the guide clasp is mounted thereon. The outer ends of the arms 33 and 33a are joined by a flat strap 35 and the arcuate arms 32 are joined together by flat straps 36 on diametrically opposed sides of the clasp 30. The straps 35 and 36 may be provided with arrows 37 indicating which end of the clasp 30 is to be aligned with the selected graduation 24.

The gauge bar 31 is a flat bar of suitable spring metal which is provided at its rear end with a plunger-engaging yoke 40. This yoke 40 has a spring clasp yoke portion 41 which will straddle and clasp on the neck 26 of the plunger 21, as shown in Figure 3. It is also provided with a flat disk-like portion 42 which will engage the flat rear side of the head 27 of the plunger. It will be noted that yoke 40 is connected integrally with the bar 31 and that the connection is made so that the forward end of the bar 31 will tend to swing outwardly (Figures 3 and 5) so that the bar will normally be angularly disposed relative to the axis of the plunger 21, as shown in Figure 3. The extreme forward end of the bar 31 is provided with a stop 44 which is pivoted thereto on a vertical pivot 45 for rotation transversely of the bar. The adjacent surfaces of the gauge bar 31 are provided with interfitting teats and indentations which serve to normally locate the stop 44 transversely of the bar substantially at right angles thereto. However, if sufficient force is applied to the stop 44, it can be rotated so that it is superimposed in axial alignment with the bar 31, it being understood that the stop is the same width or of less width than the bar. When the stop has been moved into this latter position, as shown by the dotted lines in Figure 9, the gauge bar can be passed through the openings 34 and 34a of the respective guide arms 33 and 33a in either direction. This will permit assembly or disassembly of the plunger and barrel of the syringe having the parts of my gauging device mounted thereon.

It will be apparent from the above description that the guide clasp 30 can be mounted on the barrel 20 merely by slipping it axially inwardly over the barrel from its forward end with a twisting action so that the clasp will tightly embrace the barrel. The gauge bar 31 is clasped to the rear end of the plunger 21 by similarly forcing the yoke structure 41 around the neck 26 while positioning the disk portion 42 in juxtaposition with the outer surface of the head 27 of the plunger. Thus, at this time the guide clasp 30 will be on the barrel as shown in Figure 2 and the gauge bar 31 will be on the plunger 21 as shown in Figure 3.

The two parts of the syringe with the gauge parts thereon may now be assembled by slipping the forward end of the plunger 21 slightly into the rear end of the barrel 20. The stop member 44 is axially aligned with the gauge bar 31 as shown by the dotted lines in Figure 9. Then by pressing downwardly on the gauge bar 31, the extreme forward end thereof is aligned with the rear opening 34a in the guide clasp 30. The thickness of the gauge bar 31 plus that of the pivoted stop 44 is less than the height of the openings 34 and 34a which may be of substantially the same size. Also, the width of the gauge bar will be less than that of the openings. Therefore, if the plunger 21 is now pushed farther into the barrel 20, the bar 31 can pass into and through the opening 34a and then the opening 34. After the gauge bar is completely inserted in and through the guide clasp 30, the stop member 44 is pivoted to its right angular position relative to the gauge bar 31, as shown by full lines in Figure 9, and since it is longer than the width of the opening 34 in the arm 33, it will serve as a stop to prevent withdrawal of the gauge bar 31 from the guide clasp 30 and will, consequently, prevent withdrawal of the plunger 21 from the barrel 20. The use of the two arms 33 and 33a will prevent lateral twisting of the gauge bar 31. To remove the plunger 21 from the barrel 20, for cleaning and sterilizing, the reverse of the assembling steps descriped above are followed.

With the device in the condition illustrated in Figure 10, the physician treating a patient will decide how much of a dosage of insulin is required by the patient. He will then move the guide clasp 30 along the barrel 20 to the proper position so that the front edge of the member 30 aligns with the calibration 24 on the syringe barrel indicating the proper amount in units of insulin to be injected. The next step is to insert the needle 23 into the rubber cap of the insulin vial, and force the plunger 21 inwardly as far as possible into the barrel 20 as shown in Figure 11. This forces substantially the same amount of air into the sealed vial as the amount of insulin to be withdrawn, and thereby avoids a vacuum in the vial which would prevent the withdrawal of subsequent doses. The plunger 21 is now withdrawn, as shown in Figure 12, until the oppositely extending ends of the stop 44 engage the outer surface of the forwardmost arm 33 of the guide clasp 30. At this time a supply of insulin will have filled the barrel 20 of the syringe but the usual air bubbles B which are present in the hollow part of the needle 23 and the hollow part of the needle stem 22 will be in the syringe barrel. To eliminate these air bubbles, the plunger 21 is pushed forward sufficiently, as shown in Figure 13, while the needle is still in the vial. Then the plunger is again withdrawn as far as possible, as determined by engagement of the stop 44 with the arm 33, as shown in Figure 14, and this will provide the predetermined dose of insulin in the syringe barrel as prescribed by the physician and without the air bubbles. The needle is now withdrawn from the vial and inserted for injection, which is accomplished merely by pushing forward on the plunger.

It will be apparent that with this gauge member, the correct dose of insulin or other substance will be administered and this will not be dependent upon the judgment of the patient but will be dependent upon the setting of the guide clasp 30 which will be set by the physician. This guide clasp will cooperate with the stop member 44 to limit the amount of insulin pulled into the syringe barrel, prior to the injection, to the exact dose prescribed by the physician. The gauge bar 31 is so constructed as to have an outward tension to cause some friction on the upper edges of the guide holes 34 and 34a. This prevents the plunger 21 from moving too freely. Thus, it prevents the loss of insulin due to accidental forward movement of the plunger while preparing for an injection. The forward guide arm 33 cooperates with stop member 44 to prevent farther backward movement of the plunger 21, thereby precluding the withdrawal of air into the syringe barrel while preparing to make the injection. Furthermore, because of the provision of the stop 44 and the guide clasp 30, it will be impossible for the plunger 21 to accidentally fall from the barrel 20 which might cause breakage of the plunger. The guide clasp 30 may have its arms 32 of proper diameter to fit on syringe barrels of varying sizes, the spring 30a assisting in compensating for these variations in size so that the clasp 30 will more tightly clasp the barrel. The flat strap 35 connecting the radially extending arms 33 and 33a to the body of the guide clasp 30 serves as a means to protect the guide bar 31 when holding the syringe barrel 20 for the injection. Thus, when the guide bar 31 moves forwardly during injection, it will be free to move unobstructed by the fingers if the barrel is grasped in the area of the guide clasp. My gauging device is relatively simple and inexpensive to make and can be attached to or removed from the syringe with ease.

Although I have referred to my gauge member as being applied to a syringe which is especially useful for the injection of insulin, it can be used on syringes for other purposes such as immunization inoculations.

Various other advantages will be apparent from the preceding description, the drawings and the following claims.

Having thus described my invention, what I claim is:

1. In combination with a hypodermic syringe comprising a barrel and a plunger movable therein, a gauge on the syringe, said gauge comprising a guide member mounted on the barrel of the syringe, said guide member having a portion engaging the barrel of the syringe and a radially disposed guide arm having an opening therein, a gauge member mounted on the plunger of the syringe and being in the form of a bar passing through the said opening, said bar having its rear end connected to the plunger and its forward end free from the plunger, spring means tending to move the free end of the bar outwardly in frictional engagement with said opening, and a stop member on the gauge member positioned to engage the guide member adjacent said opening when the plunger is retracted relative to the barrel so as to predetermine the amount of liquid which can be pulled into the barrel of the syringe by the retracted movement of the plunger, said stop member being pivoted to the forward end of said gauge bar so that it can be adjusted to extend transversely thereof so that it will not pass through said opening or to extend in axial alignment therewith so it will pass through said opening.

2. The combination of claim 1 in which interfitting portions are provided on the adjacent surfaces of the pivoted stop member and the guide bar to normally locate the stop member transversely of the bar.

3. The combination of claim 2 in which the guide member has two axially spaced radially extending guide arms having aligning guide openings through which the gauge bar passes to prevent lateral twisting or binding in the guide member.

4. The combination of claim 1 in which the portion of the guide member which engages the barrel includes an arcuate arm portion having a spring thereon which yieldingly engages the barrel so that the guide member can be adjusted axially of the barrel and will fit barrels of varying sizes.

5. The combination of claim 4 in which the rear end of the guide bar has a spring clasping portion which removably engages the head of the plunger.

References Cited in the file of this patent

UNITED STATES PATENTS

| 996,128 | Payne et al. | June 27, 1911 |

FOREIGN PATENTS

| 5,541 | Great Britain | Mar. 7, 1907 |
| 182,206 | Switzerland | Apr. 16, 1936 |